Feb. 3, 1970 W. P. SIEGEL 3,493,796
ELECTROMAGNETICALLY ACTUATED, HIGH INERTIA CLUTCH BRAKE MOTOR
Filed March 20, 1968 2 Sheets-Sheet 1

WITNESS

*William Martins Jr.*

INVENTOR.
Walter P. Siegel
BY
*Marshall J. Breen*
ATTORNEY

Feb. 3, 1970 W. P. SIEGEL 3,493,796
ELECTROMAGNETICALLY ACTUATED, HIGH INERTIA CLUTCH BRAKE MOTOR
Filed March 20, 1968 2 Sheets-Sheet 2

INVENTOR.
Walter P. Siegel
BY
ATTORNEY

United States Patent Office 3,493,796
Patented Feb. 3, 1970

3,493,796
ELECTROMAGNETICALLY ACTUATED, HIGH
INERTIA CLUTCH BRAKE MOTOR
Walter Philip Siegel, Paramus, N.J., assignor to The
Singer Company, New York, N.Y., a corporation of
New Jersey
Filed Mar. 20, 1968, Ser. No. 714,680
Int. Cl. H02k 7/112
U.S. Cl. 310—76        4 Claims

ABSTRACT OF THE DISCLOSURE

An electric motor of the inverted type, wherein the rotor core surrounds the stator core, has a hollow rotor shaft and an output shaft journaled concentrically within the rotor shaft. The output shaft carriers a magnetic clutch disc which, by electromagnetic attraction, is drawn into engagement with a rotatable bipolar magnetic structure driven by the rotor and excited by a stationary annular clutch coil. The bipolar magnetic structure is provided by a composite ring formed with concentric outer and inner magnetic rings separated by an integrally-cast, nonmagnetic spacer ring. The inner ring is secured to a spider ring which supports the rotor core on the hollow shaft and which forms with the rotor core a flywheel having large inertia effect. The concentric rings have end surfaces which lie in a common plane normal to the axis of the rotor shaft and these surfaces are positioned axially adjacent to the clutch disc. The clutch coil is secured to a stationary magnetic ring mounted on the motor housing which ring cooperates with the flywheel ring and the concentric rings to provide a magnetic flux path closely surrounding the clutch coil. This path is substantially closed when the clutch disc is drawn into frictional engagement against the bipolar structure.

BACKGROUND OF THE INVENTION

In prior art combined motor and electromagnetic clutch structures of which I am aware only conventional motors of the type having the rotor core rotating inside the stator core have been used. This requires the output shaft to be journaled at both ends in bearings supported by end bells secured to the opposite ends of the motor housing and the presence of a bearing at the clutch end interferes with and greatly complicates the necessary electromagnetic clutch structure. As a result, the electromagnetic clutch has been in some cases regarded as an attachment to be added on externally to the conventional motor structure, thus producing a combined structure of extreme overall length and posing a difficult shaft alignment problem. Where prior art attempts have been made to enclose the electromagnetic clutch structure within the motor itself, it has been necessary to mount the clutch oil on the motor end bell and to provide a long inefficient flux path which encloses electrically active parts of the motor itself and which is undesirable. Further difficulties are presented by this prior art approach because of insufficient inherent motor flywheel inertia for proper clutched acceleration of the load.

SUMMARY OF THE INVENTION

The present invention has as its general object the solution of the above prior art difficulties by combining inverted electric motor structure having an inherently high rotational inertia with electromagnetic clutch structure in which a stationary clutch coil mounted on the motor housing is closely coupled to an efficient magnetic flux path including th emovable magnetic clutch disc. Both the flywheel and the clutch disc can be made of large diameter approximating the full internal diameter of the motor housing which diameter is important to the torque-transmitting capability and without substantial increase in the overall length. A further advantage of the structure of this invention is that the end bell is left free for supporting only the brake coil and is not required to carry any magnetic flux from the clutch coil thus avoiding any adverse coupling between the clutch and brake fluxes.

In further carrying out the objects of this invention, an annular stationary clutch coil, positioned closely adjacent the flywheel element, is secured to a magnetic ring mounted on the inside surface of the motor housing. A composite ring formed with concentric outer and inner magnetic rings separated by an integrally-cast non-magnetic spacer ring has an end surface which lies in a common plane normal to the rotor shaft axis and presents a bipolar magnetic structure which faces the clutch disc in close proximity thereto.

Figure 1:
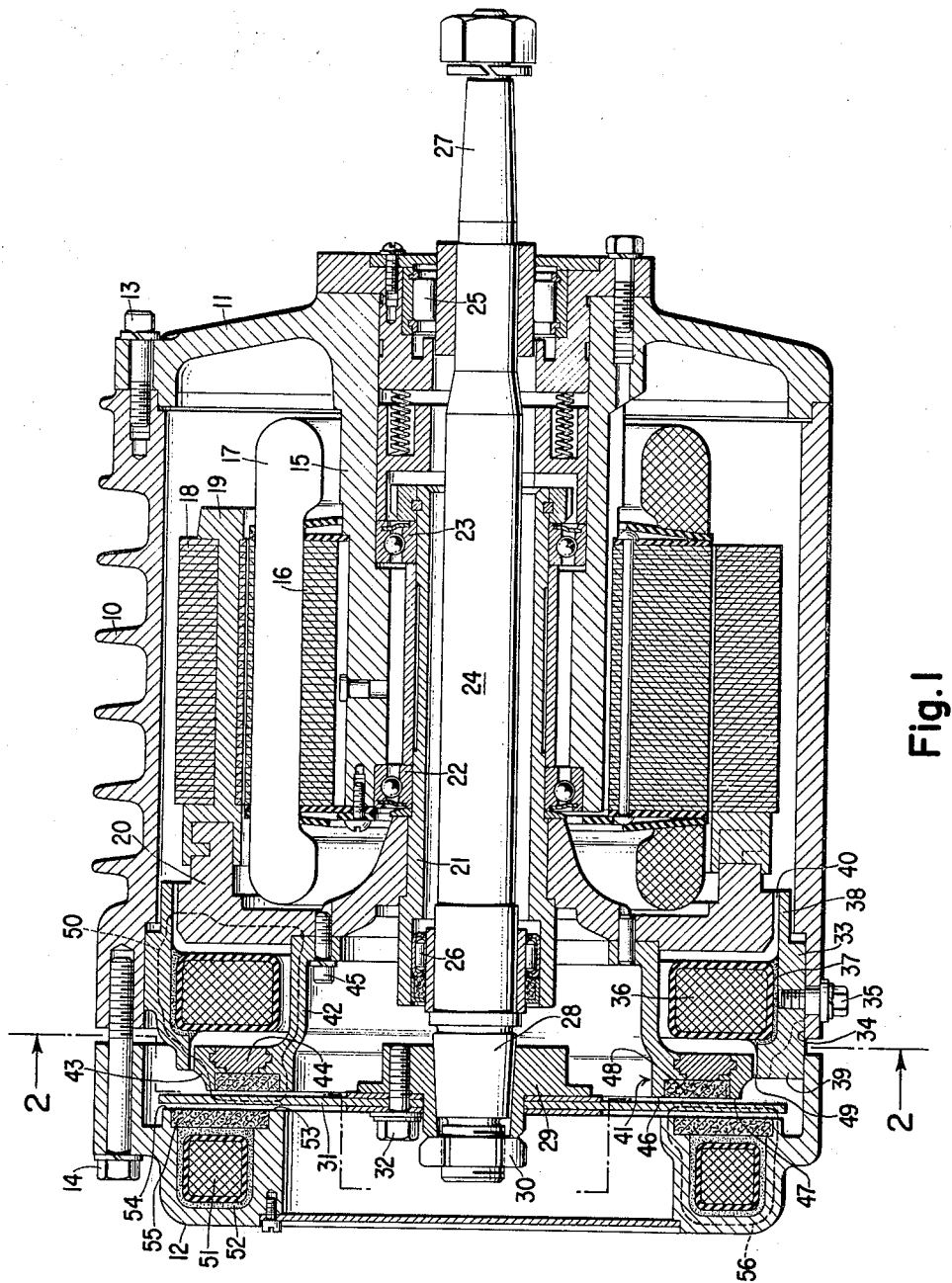
Figure 2:
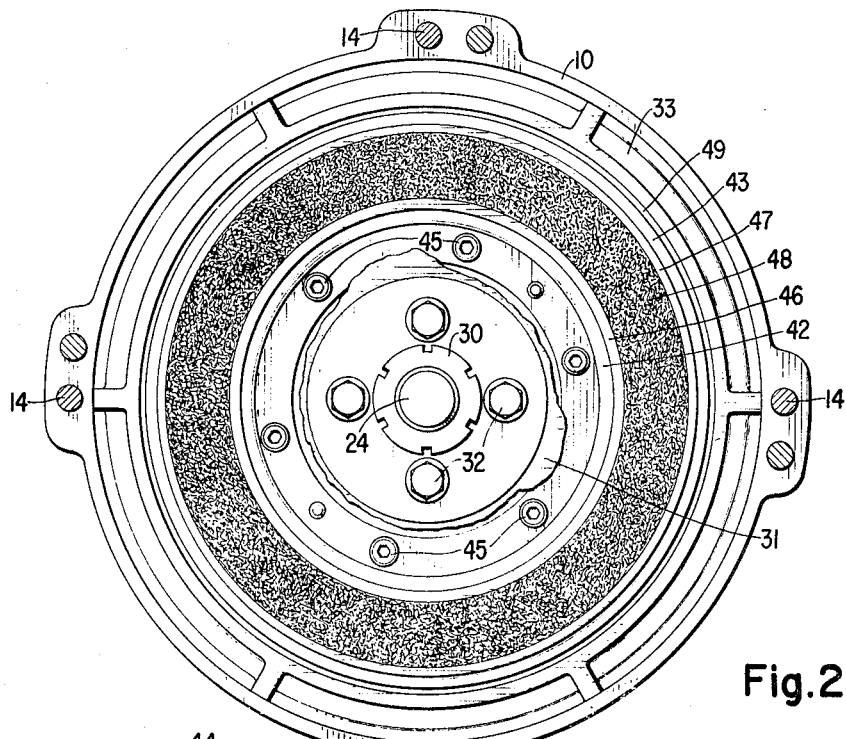
Figure 3:
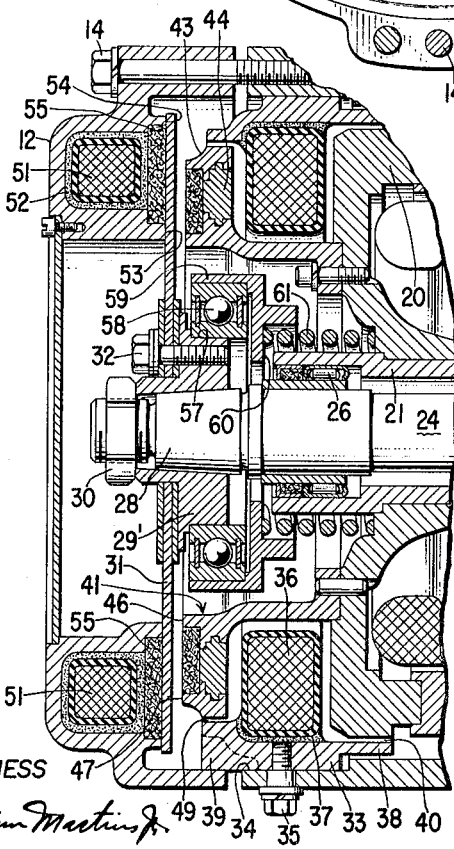

In the drawings, FIG. 1 is a longitudinal sectional view taken through an electromagnetically actuated clutch-brake motor illustrating an embodiment of this invention, FIG. 2 is a transverse sectional view taken along line 2—2 of FIG. 1. FIG. 3 is a fragmentary longitudinal sectional view illustrating a modification of the embodiment of FIG. 1.

DESCRIPTION OF THE INVENTION

Referring now to FIG. 1, a motor frame or casing is provided which includes a cylindrical housing 10 and end closures 11 and 12 secured to the housing 10 by respective bolts 13 and 14 circumferentially spaced and tapped into the housing 10 as shown. A re-entrant tubular support 15 formed integrally with the end-closure 11 extends into the housing 10 substantially concentrically with its cylindrical wall and supports a stator core 16 which carries a stator winding 17 connected to a source of electrical power (not shown).

A rotor core 18 surrounds the stator core 16 and contains cast-in conducting bars 19 which are cast integrally with a spider ring 20 secured for rotation with a hollow rotor shaft 21 journaled in bearings 22 and 23 carried by the stator support 15.

An output driven shaft 24 extends through the interior of the hollow rotor shaft 21 and is journaled at one end in a roller bearing 25 carried by the end closure 11, and at the other end in a roller bearing 26 carried internally by the rotor shaft 21. It will be seen that the driven shaft 24 is thus journaled for rotation and supported preferably for limited endwise sliding movement relative to the stationary housing 10.

The exterior end of the driven shaft 24 is provided with a tapered portion 27 to receive a gear or pulley (not shown) for driving a machine (not shown) such as a loom or a sewing machine.

The other end of the driven shaft 24 is formed with a tapered portion 28 which carries a hub 29 secured thereto by a nut 30. A clutch disc 31 of magnetic material is secured to the hub 29 by means of circumferentially spaced tap bolts 32. Structure similar to that thus far described is disclosed in the Scheuerer U.S. Patent No.

3,253,686, to which reference may be had for a more complete description thereof.

There will now be described specific structure for electromagnetically actuating the clutch disc 31 into a clutched or braked condition.

A stationary magnetic ring 33 is slidably fitted within a counterbored portion 34 of the housing 10 and is adjustably secured therein by circumferentially spaced tap bolts 35. A clutch coil 36 of annular shape is previously assembled and secured to the ring 33 by any suitable means, such as by embedding in an epoxy adhesive material 37 as shown. The ring 33 and coil 36 assembly is positioned with the coil 36 closely adjacent to the spider ring or flywheel 20 which is made of magnetically conducting metal. The ring 33 is considerably longer in axial extent than the coil 36 and provides overhanging portions 38 and 39 on both sides of the coil 36. The portion 38 is positioned closely adjacent to and radially outside of the spider ring or fly wheel 20 and forms therewith an air gap 40 having a low reluctance by virtue of its low ratio of radial to axial dimensions.

A composite ring denoted generally by 41 is formed with an inner ring 42 and an outer ring 43 held in concentric relation by a cast-in non-magnetic spacer ring 44. The inner ring 42 is secured to the spider 20 by circumferential-spaced bolts 45 and rotates therewith. The concentric rings 42 and 43 have respective polar end surfaces 46 and 47 which lie in a common plane normal to the axis of the rotor shaft 21, which plane is positioned closely adjacent to and parallel with the face of the clutch disc 31. Friction material 48 fills the annular space between the rings 42 and 43 to provide a gripping surface for good torque transmission to the clutch disc 31.

The overhanging portion 39 is positioned radially outside of and close to the periphery of the outer ring 43 and forms therewith an air gap 49 having a low reluctance by virtue of its low ratio of radial to axial dimensions.

It will be seen that the concentric ring structure above described forms a rotatable bipolar magnetic structure mechanically driven by the rotor and which attracts the clutch disc 31 to it in frictional driving relation by virtue of magnetic flux set up in the toroidal path indicated by the dashed line 50 due to excitation of the clutch coil 36. The disc 31 transmits this driving torque to the output shaft 24 to drive the load.

The clutch disc 31 is preferably a relatively thin flat disc supported centrally on the hub 29 so that the radially outer portions thereof may initially be flexed by magnetic attraction into engagement with the clutch and/or brake friction material 48 and 55 respectively, and quite independently of axial movement of the shaft 24.

It is well within the skill of one versed in this art to provide for limited axial movement of the clutch disc 31 relative to the shaft 24, if required, by making a well-known axially sliding splined connection between the hub 29 and the shaft 24.

It will further be seen that the flux path 50 is closely and efficiently coupled to the coil 36 and does not traverse any of the electrically active parts of the motor structure. The maximum flux density is produced in the working air gaps formed respectively between each of the end faces 46, 47 and the disc 31 for establishing very high forces of attraction in these regions. These forces are produced at points having large radial distances from the axis of the output shaft 24 and so provide a large driving torque capability. The major portion of the material forming the magnetic path 50 is rotating thus contributing desirably to the stored kinetic energy of the driving system.

Since the flux path for the clutch coil 36 does not traverse the end closure 12, said end closure can be designed solely to provide an electro-magnetically actuated braking torque with respect to the disc 31. Accordingly, the end closure 12 is formed of magnetic material with a single annular recess in which a brake coil 51 is secured, as by embedding in epoxy adhesive material 52. This provides a stationary bipolar structure having end polar surfaces 53 and 54 which lie in a common plane normal to the axis of the rotor shaft 21, and which are positioned in close face-to-face proximity with the disc 31. The annular space between the polar surfaces 53 and 54 is filled with a friction material 55 which develops a large braking torque when the brake coil 51 is energized to attract the disc 31 into engagement therewith.

he toroidal flux path indicated by the dashed line 56 for the flux produced by the brake coil 51 is closely coupled to the coil and provides forces which are applied at a large radial distance from the axis of the output shaft 24 to produce a large braking torque capability.

In the embodiment above described and shown in FIGS. 1 and 2, the output shaft 24, in the absence of excitation of the clutch and brake coils 36 and 51, is free to move axially by an amount limited by the clearance between the disc 31 and the bipolar structures of the clutch and brake electromagnets. In some instances it is desirable to have the output shaft normally biased to a braked condition of a predetermined amount. For this purpose, the modified embodiment shown in FIG. 3 is used.

Referring to FIG. 3, all the structure described with respect to FIGS. 1 and 2 is used with the following additions:

The hub 29' now contains a stepped portion 57 on which is mounted a ball-bearing 58 having its outer race fitted into a cup 59. The cup 59 is formed with a counterbore 60 in which is received one end of a helical compression spring 61, the other end of which abuts against the spider ring 20. The spring 61 provides a compressive force which urges the disc 31 into engagement with the brake frictional material 55 to provide an initial brake biasing torque proportional to the compression of the spring. The ball bearing 58 provides relative rotation between the disc 31 and the spider or fly wheel 20 without adverse winding or unwinding of the spring 61.

Having thus set forth the nature of this invention, what is claimed herein is:

1. In combination, an electric motor having a stator core mounted within a stationary housing, a hollow rotor shaft journaled in said housing, a rotor core positioned outside the stator core and with its outside surface radially adjacent the housing, magnetic flywheel means secured to said hollow shaft and supporting the rotor core, and output shaft rotatably journaled within the rotor shaft, a stationary magnetic ring secured to the houing and positioned radially adjacent to and outside the flywheel means, an annular clutch coil secured to the stationary ring and positioned axially adjacent to the flywheel means, a composite ring formed with concentric magnetic outer and inner rings separated by an integrally-cast non-magnetic spacer ring, means securing the inner ring to the flywheel means, said concentric rings having end surfaces lying in a common plane normal to the axis of the rotor shaft and presenting an annular rotatable bipolar structure, and magnetic clutch disc means secured for rotation with the output shaft and positioned axially adjacent to the bipolar structure for attraction thereto when the clutch coil is energized.

2. Structure according to claim 1 wherein the stationary ring, the flywheel means and the concentric rings provide a path for magnetic flux surrounding the clutch coil, which path is substantially closed when the clutch disc is drawn against the bipolar structure.

3. Structure according to claim 1 wherein the stationary ring is separated from the flywheel and from the outer concentric ring by air gaps having small radial to axial dimension ratios.

4. Structure according to claim 1 including a magnetic end bell mounted on the stationary ring and detachably secured to the motor housing, said end bell being formed with an annular recess providing a stationary annular bipolar magnetic structure having end faces lying in a common plane normal to the rotor shaft axis and axially adjacent to and facing the clutch disc on the side thereof opposite the composite ring and having secured in said annular recess a brake coil which when energized draws said clutch disc into frictional engagement with said stationary bipolar structure.

References Cited

UNITED STATES PATENTS

| | | | |
|---|---|---|---|
| 2,668,460 | 2/1954 | Butterfield | 192—18.2 |
| 2,717,967 | 9/1955 | Turner | 310—76 |
| 2,721,279 | 10/1955 | Wendel | 310—76 |
| 3,364,670 | 1/1968 | Stiepel | 192—18.2 |
| 3,387,157 | 6/1968 | Cook | 310—76 |

MILTON O. HIRSHFIELD, Primary Examiner

R. SKUDY, Assistant Examiner